O. M. SMITH.

Umbrella Runners.

No. 5,478. Reissued July 1, 1873.

Witnesses
John A. Ellis
Edward E. Ellis

Inventor
Orren M. Smith
per
C. H. Watson & Co
Atty's

A.M. PHOTO-LITHOGRAPHIC CO. N.Y. (OSBORNE'S PROCESS.)

UNITED STATES PATENT OFFICE.

ORREN M. SMITH, OF PHILADELPHIA, PENNSYLVANIA.

IMPROVEMENT IN UMBRELLA-RUNNERS.

Specification forming part of Letters Patent No. 116,767, dated July 4, 1871; reissue No. 5,478, dated July 1, 1873; application filed May 20, 1873.

*To all whom it may concern:*

Be it known that I, ORREN M. SMITH, of Philadelphia, county of Philadelphia, State of Pennsylvania, have invented certain new and useful Improvements in Umbrella Runners or Notches; and I do hereby declare that the following is a full, clear, and exact description of the same, reference being had to the accompanying drawings and to the letters of reference marked thereon, which form a part of this specification:

The nature of my invention consists in the construction and arrangement of the head of an umbrella notch or runner, as will be hereinafter more fully set forth.

In order to enable others skilled in the art to which my invention appertains to make and use the same, I will now proceed to describe its construction and operation, referring to the annexed drawing, in which—

Figure 1:
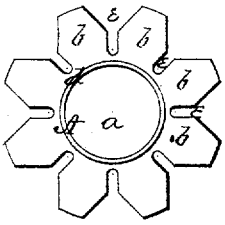
Figure 2:
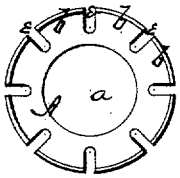
Figure 4:
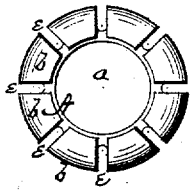
Figure 5:
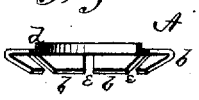
Figure 6:
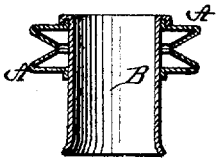

Figure 1 is a plan view of a stamped plate, showing the first stage in the construction of the head for an umbrella-runner. Fig. 2 is a plan view; and Fig. 3, a longitudinal section of the same plate after passing through the second stage in the construction. Figs. 4 and 5 are corresponding views of the plate after passing through the third stage in the construction. Fig. 6 is a vertical section of the completed umbrella notch or runner.

Figure 3:
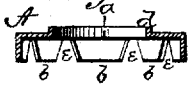

In constructing my improved runner or notch a plate, A, of suitable dimensions is subjected to the action of suitable punches or dies, or other devices, and cut or stamped in the shape shown in Fig. 1—that is, with a central hole, *a*, and a suitable number of arms, *b b*, with intervening slots *e e*, and a small upward-projecting flange, *d*, around the central orifice *a*. The disk thus cut is then subjected to the action of other dies, by which all the arms *b b* are bent at right angles, as shown in Figs. 2 and 3, the direction of the bent arms *b b* being opposite to that of the flange *d*. The arms *b b* are then, by suitable means, further bent and depressed so as to assume the position shown in Figs. 4 and 5, which completes the construction of the disk. Two of these disks may then be placed with their bent arms together, as shown in Fig. 6, and soldered to a tube, B, so as to form the grooved and slotted head of a runner or notch. The perforated ends of the umbrella or parasol ribs are introduced, one into each of the slots *e*, between the bent arms, and a wire is passed through the holes of the ribs and coiled in the groove between the two disks, as usual, thereby jointing the ribs to the runner or notch. In many cases only one of the disks A may be used to form the runner by using the flange *d* as the tube, said flange being then made of suitable size for the purpose, and the wire which fastens the ribs inserted within the bends of the arms *b b*. The umbrella runner or notch will then present the appearance as shown in Figs. 4 and 5.

I am aware that a runner has been made of a disk provided with a flange or collar placed at right angles with the plane of said disk, having radial arms cut tapering toward their outer ends, the intervening slots being of similar angular form, but reversed in position, the said arms being bent inward toward the umbrella-stick, and made to inclose the circular or other formed projections on the ribs.

Such construction, however, I do not claim broadly, but—

Having thus fully described my invention, what I claim as new, and desire to secure by Letters Patent, is—

1. The disk A, having a flange, *d*, and radial arms *b* formed with partly straight and partly tapering sides, with intervening slots of similar character, the tapering ends of said arms being bent inwardly at an acute angle, as shown in Fig. 5 of the drawing, the whole constructed and constituting a device of the particular form described and shown, for the purpose set forth.

2. The head of an umbrella runner or notch, composed of two metal disks cut, bent, and secured to a tube, substantially in the manner described.

In testimony that I claim the foregoing as my own, I affix my signature in the presence of two witnesses.

ORREN M. SMITH.

Witnesses:
C. ALEXANDER,
EDWARD E. ELLIS.